(12) United States Patent
Burns

(10) Patent No.: US 10,894,634 B2
(45) Date of Patent: Jan. 19, 2021

(54) OPENING AND RECLOSING DEVICE FOR PACKAGES

(71) Applicant: Andrew Burns, Warwickshire (GB)

(72) Inventor: Andrew Burns, Warwickshire (GB)

( * ) Notice: Subject to any disclaimer, the term of this patent is extended or adjusted under 35 U.S.C. 154(b) by 0 days.

(21) Appl. No.: 16/203,893

(22) Filed: Nov. 29, 2018

(65) Prior Publication Data
US 2019/0161244 A1 May 30, 2019

(30) Foreign Application Priority Data
Nov. 30, 2017 (GB) .................................. 1719965.4

(51) Int. Cl.
*B65D 33/25* (2006.01)
*A44B 19/26* (2006.01)
*A47J 47/06* (2006.01)

(52) U.S. Cl.
CPC ........ *B65D 33/2591* (2013.01); *A44B 19/267* (2013.01); *A47J 47/06* (2013.01)

(58) Field of Classification Search
CPC  B65D 33/2591; B65D 33/25; B65D 33/2508; B65D 33/2533; B65D 33/2541; B65D 33/2558; B65D 33/2566; B65D 33/2583
USPC .................................... 383/202, 63, 203, 64
See application file for complete search history.

(56) References Cited

U.S. PATENT DOCUMENTS

| | | | | |
|---|---|---|---|---|
| 2,994,469 | A * | 8/1961 | Troup | B65D 33/2591 383/202 |
| 4,580,342 | A * | 4/1986 | Beuzart | B67B 7/30 222/81 |
| 6,287,000 | B1 * | 9/2001 | Buchman | B65D 33/2591 24/399 |
| 6,578,243 | B1 * | 6/2003 | Hall | B67B 7/30 24/30.5 R |
| 7,643,378 | B2 * | 1/2010 | Genosar | B65D 33/2591 206/459.1 |
| 7,670,052 | B2 * | 3/2010 | Chaturvedi | B65D 33/2591 24/399 |

(Continued)

FOREIGN PATENT DOCUMENTS

GB          2528720      *   2/2016   ............. B65D 33/25

OTHER PUBLICATIONS

Intellectual Property Office (United Kingdom), "Combined Search and Examination Report under Section 17 and 18(3)," App. No. GB1620309.3 (Feb. 7, 2017).

*Primary Examiner* — Derek J Battisti
(74) *Attorney, Agent, or Firm* — Walters & Wasylyna LLC

(57) ABSTRACT

An opening and reclosing device for a container, the opening and reclosing device comprising: an affixing means for affixing the opening and reclosing device to a container; an integral cutting tool for creating an opening in the container in a prescribed manner; and a zip-locking mechanism for re-closing the created opening, the zip-locking mechanism comprising a slider, the integral cutting tool comprising: a blade tip at a first end thereof, a thumb tab at a second end thereof; and a coupling means provided between the first and second ends, which coupling means provides for pivotal connection of the integral cutting tool to the slider, such that the integral cutting tool is pivotally moveable between: a first deployed position wherein the blade tip protrudes out of the slider for cutting an opening in a container; and a second stowed position.

13 Claims, 18 Drawing Sheets

(56) References Cited

U.S. PATENT DOCUMENTS

| | | | | |
|---|---|---|---|---|
| 9,242,766 B2 * | 1/2016 | Ruddell | ................ | B65D 33/00 |
| 10,144,554 B2 * | 12/2018 | Cui | ..................... | B65D 33/25 |
| 2007/0269143 A1 * | 11/2007 | Hickey | ............. | B65D 33/2591 |
| | | | | 383/64 |
| 2013/0305540 A1 * | 11/2013 | Ruddell | ................ | B65D 33/25 |
| | | | | 30/123 |

* cited by examiner

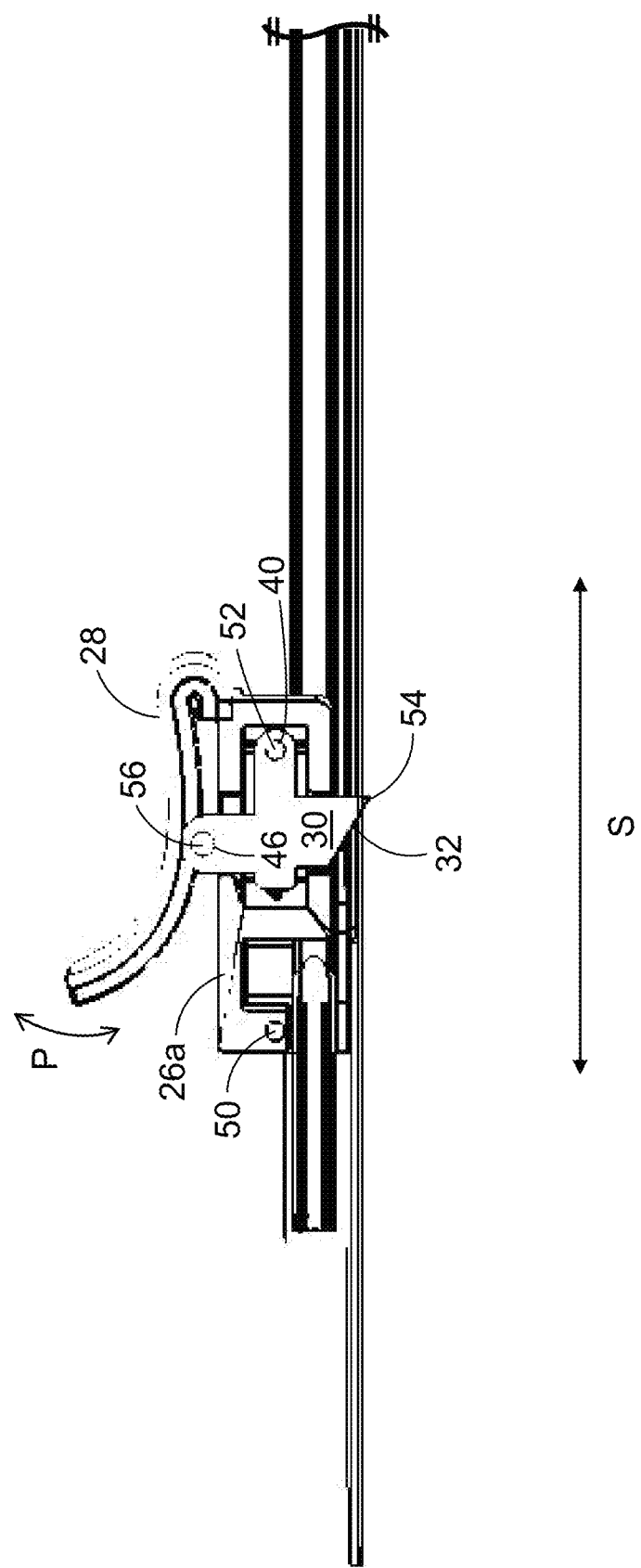

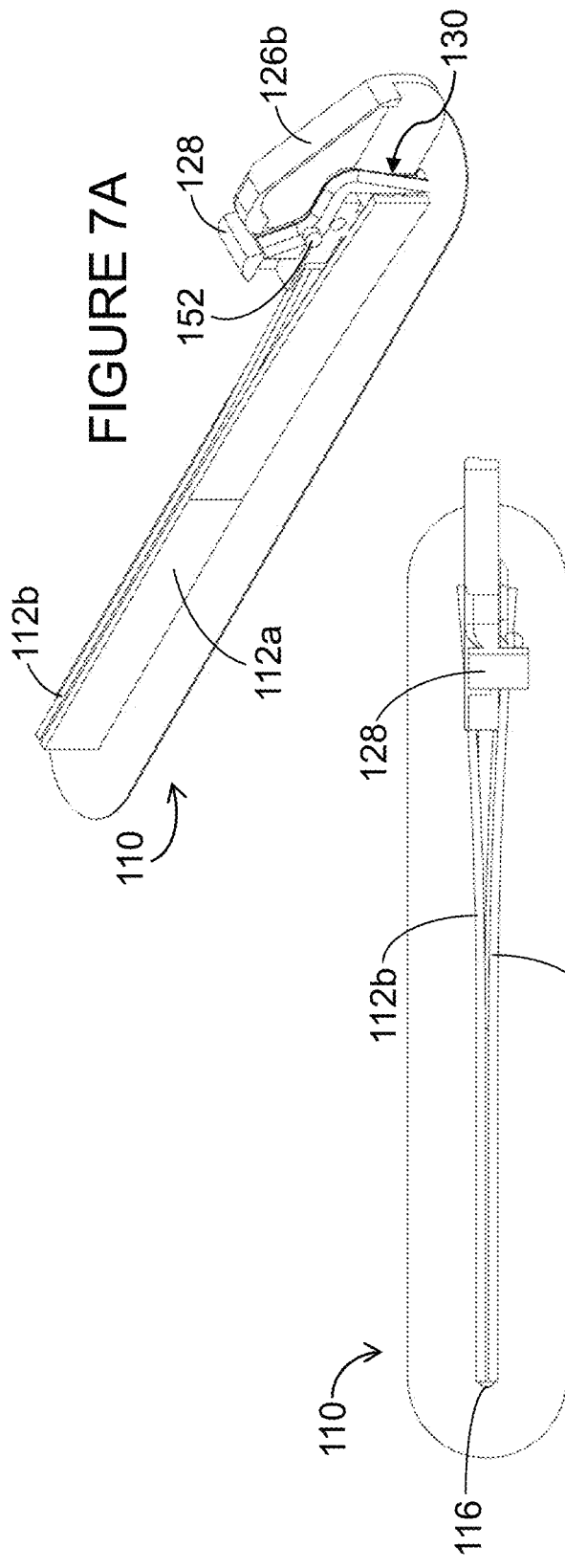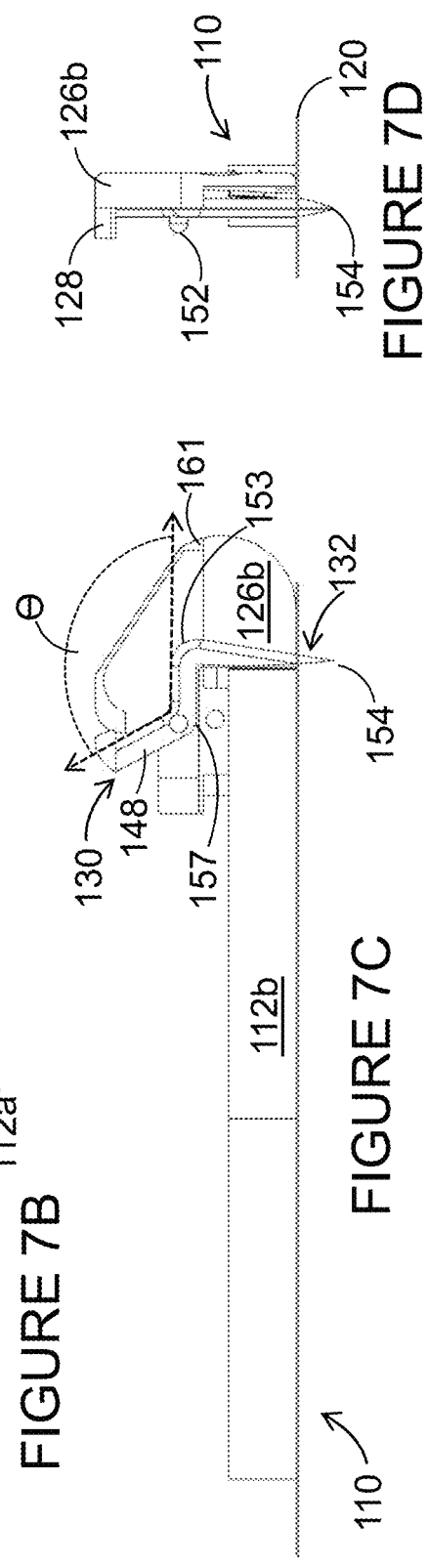

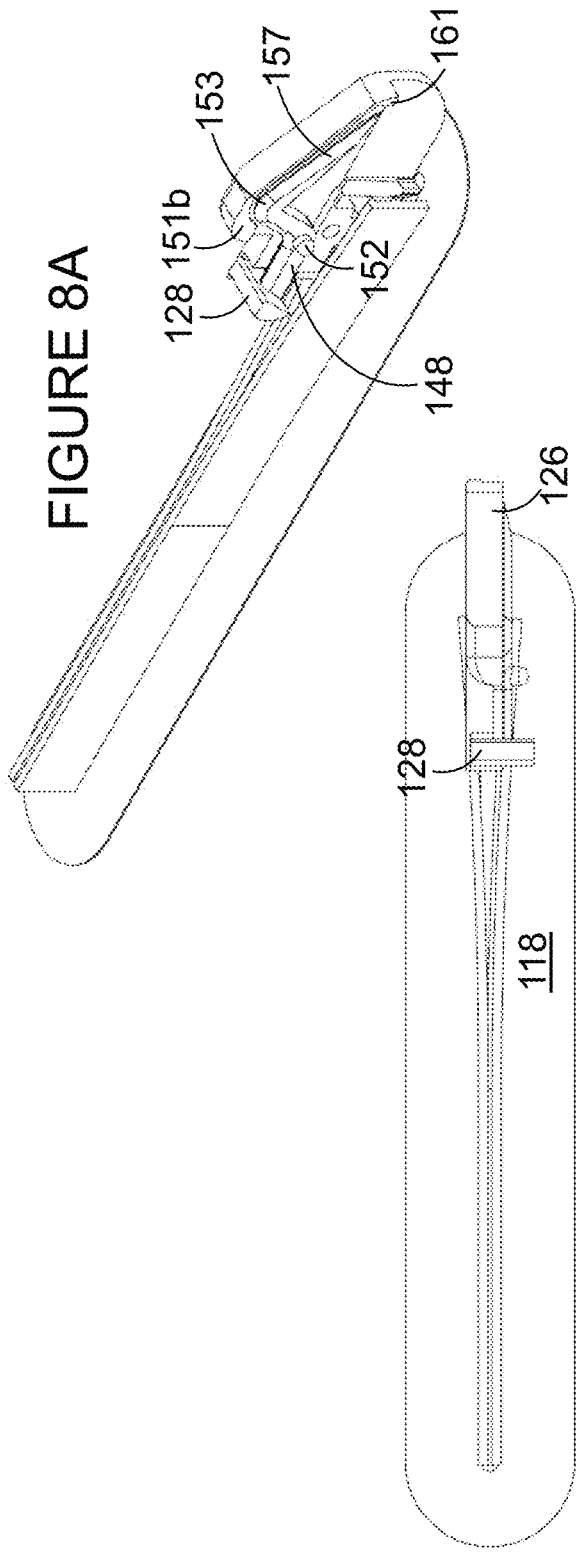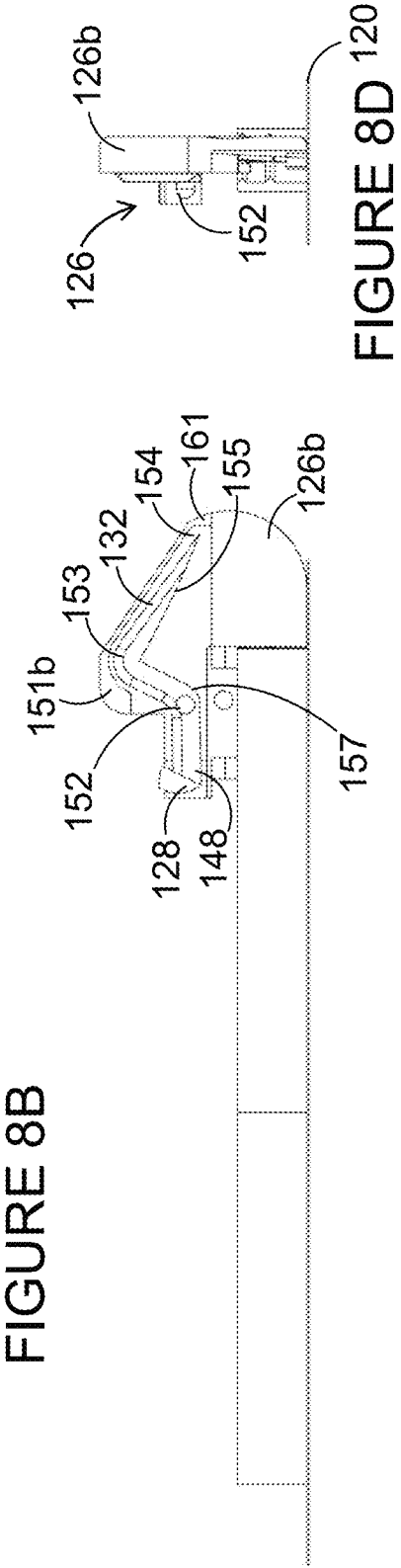

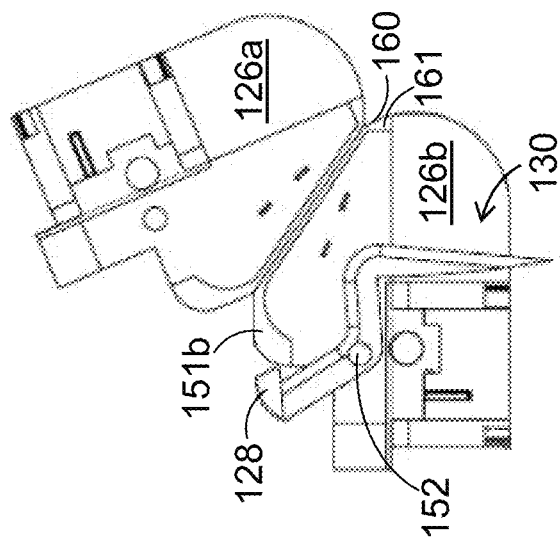
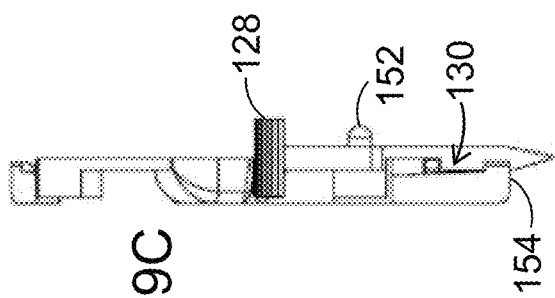
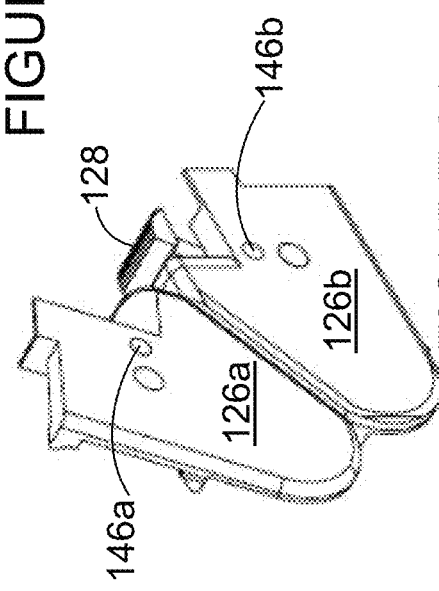
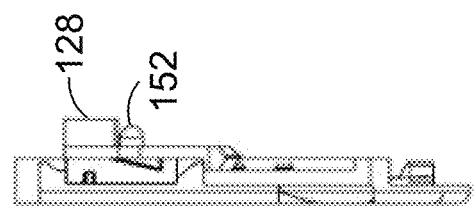
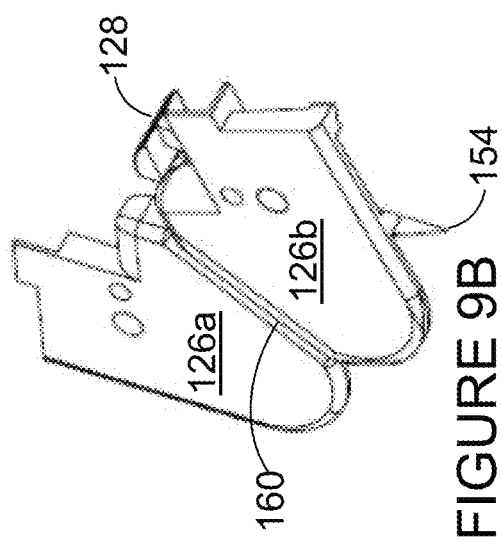
FIGURE 9A
FIGURE 9B
FIGURE 9C
FIGURE 9D
FIGURE 9E

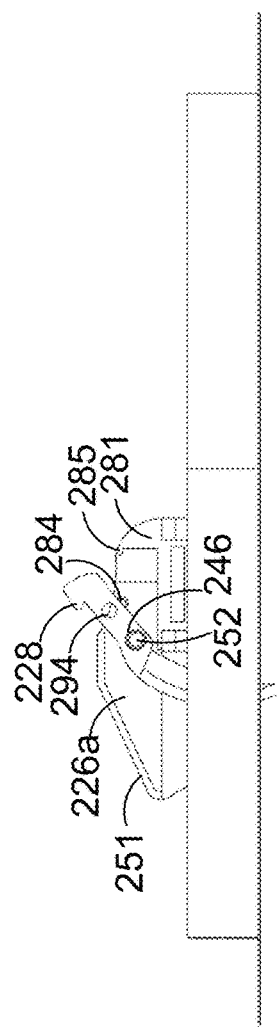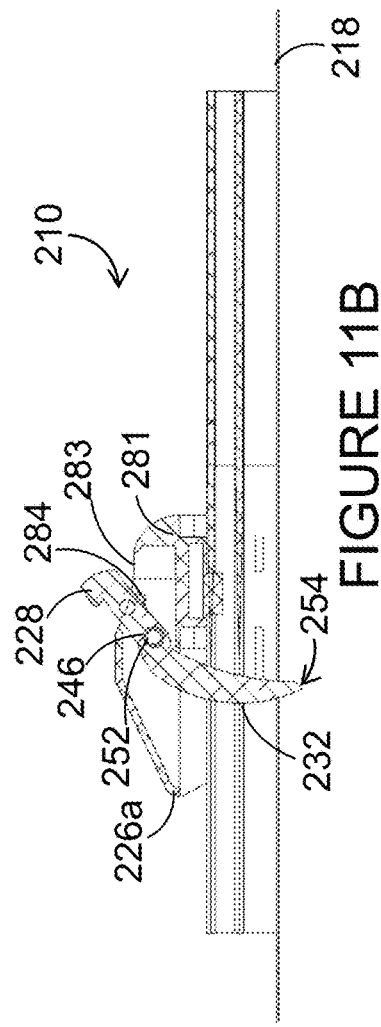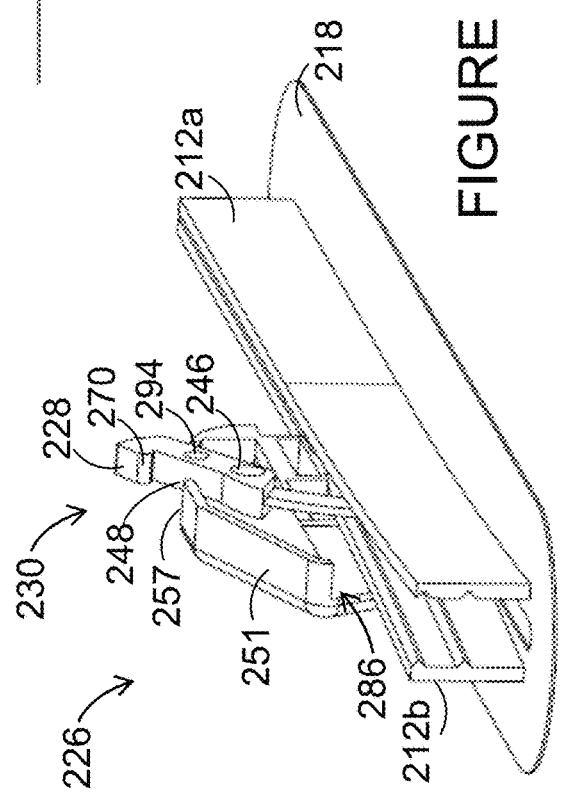

OPENING AND RECLOSING DEVICE FOR PACKAGES

PRIORITY

This application claims priority from United Kingdom Patent Application Number GB 1719965.4 filed on Nov. 30, 2017, the entire contents of which are incorporated herein by reference.

FIELD

The present invention relates to an opening and reclosing device that can be applied to a wide range of containers and items, such as bags, pouches and cartons containing foodstuffs, pet food and garden and building products such as compost, sand and cement. Particularly, but not exclusively, the present invention relates to a self-adhesive opening and reclosing device having an integral cutting means or integral cutting tool and a zip-locking mechanism for re-sealing the created opening. The invention is advantageous in a wide variety of applications, for example, for preserving product freshness or improving the shelf-life of products such as rice, cereal, pet food, frozen food and cement as well as improving the storage of items that may be consumed over a period of time after a bag containing the items has been opened, such as compost.

Aspects of the invention relate to an opening and reclosing device, to a method of opening and re-closing a container and to a container opened and re-closed by the opening and reclosing device.

BACKGROUND

In the field of packaging of products held in containers, such as rice, cereals, foodstuffs, composts, cement and the like contained in containers such as sacks and bags, it is beneficial if the container can be easily opened by a consumer. In the case of polythene bags used in a wide variety of sizes, the bags can be easily opened in a pre-determined manner using integral opening mechanisms provided on the package, for example, a strip or line of perforations or a tear tape. Alternatively, the bags can be opened in an a more arbitrary manner by the consumer tearing or otherwise cutting or breaking open the bag, for example using tools such as scissors. In either case where the container houses multiple items (for example a multi-pack of frozen chicken breasts) or a large quantity of product (for example, soil, sand, cement, pet food, rice, cereal) it is advantageous if the container can be re-closed or re-sealed to keep the remaining products within the bag and to preserve product freshness and thus extend the shelf-life of the remaining products. It is known to provide on containers themselves re-sealing tapes and other auxiliary fasteners such as sticking tape, clamps and the like can also be used to hold the bag closed after use.

The applicant of the present matter has invented an improvement in the field of packaging of products by providing an opening and reclosing device that can be applied to a wide range of articles and items. The applicant's opening and reclosing device is disclosed in GB patent GB 2528720 and as taught therein, the device can be affixed to a bag or other suitable container and comprises an integral cutting means for creating a defined opening in the bag or container in a prescribed and definite manner such that a zip-locking mechanism of the opening and reclosing device can be used to re-close the opening created to re-secure the products within the container and to preserve product freshness. The present invention relates to improvements in such a device, specifically but not exclusively, the improved device taught herein may be easier, quicker and more accurately assembled, and may mitigate against problems that have been observed when cutting certain materials, wherein some of the time, a cutting blade may drag against the material which then may bunch up and crease rather than be cut.

SUMMARY

Aspects of the invention provide an opening and reclosing device, a method of opening and re-closing a container and a container opened and re-closed by the opening and reclosing device as claimed in the appended claims.

According to one aspect of the invention, there is provided an opening and reclosing device for a container, the opening and reclosing device comprising: an affixing means for affixing the opening and reclosing device to a container; an integral cutting tool for creating an opening in the container in a prescribed manner; and a zip-locking mechanism for re-closing the created opening, the zip-locking mechanism comprising a slider, the integral cutting tool being a unitary single piece and comprising: a blade tip at a first end thereof, a thumb tab at a second end thereof; and a coupling means provided between the first and second ends. The coupling means provides for pivotal connection of the integral cutting tool to the slider, such that the integral cutting tool is pivotally moveable between: a first deployed position wherein the blade tip protrudes out of the slider for cutting an opening in a container; and a second stowed position. The slider comprises at least one internal catch and at least one portion of the integral cutting tool engages said internal catch for retaining the integral cutting tool in the second stowed position Optionally, the coupling means comprises at least one detent extending out of the plane of said integral cutting tool and wherein the slider comprises at least one aperture or recess for receiving said at least one detent. Optionally, the coupling means comprises at least one detent extending from a wall of said slider and disposed internally of said slider and wherein said integral cutting tool comprises at least one aperture or recess for receiving said at least one detent.

Optionally, the integral cutting tool comprises a first leg portion between the thumb tab and the coupling means.

Optionally, the integral cutting tool comprises a second leg portion between the coupling means and the blade tip.

Optionally, the integral cutting tool is pivotally moveable between: said first deployed position wherein the blade protrudes out of the slider for cutting an opening in a container; said second stowed position; and a third slider only position wherein the cutting tool is locked in a position wherein the thumb tab is exposed for use and yet the blade is concealed.

Optionally, the slider comprises an internal catch and wherein a lip portion of the thumb tab engages said internal catch for retaining the integral cutting tool in the second stowed position.

Optionally, the slider comprises at least one nipple for limiting the free pivotal movement of the integral cutting tool, and wherein the integral cutting tool can be moved past the nipple to pivotally move the integral cutting tool into said first deployed position wherein the blade protrudes out of the slider for cutting an opening in a container.

Optionally, the nipple is substantially hemispherical in shape.

Optionally, the coupling means comprises at least one detent extending from a wall of said slider and disposed internally of said slider and wherein said integral cutting tool comprises at least one aperture or recess for receiving said at least one detent, wherein the integral cutting tool comprises a first leg portion between the thumb tab and the coupling means, wherein the nipple comprises a blunt edge and wherein an edge of the first leg portion abuts said blunt edge for further retaining the integral cutting tool in the second stowed position.

Optionally, the slider comprises an opening and wherein the integral cutting tool is located relative to the opening such that a portion of the integral cutting tool, including said thumb tab is moveable out of the opening.

Optionally, the at least one detent extends outwardly of a plane of a main body portion of the integral cutting tool at a first corner region thereof.

Optionally, an internal radius of curvature of the corner region is between 90° and 140°.

Optionally, an internal radius of curvature of the corner region is 120°.

Optionally, said second leg portion extends from the corner region such that the first and second leg portions are angled relative to one another at an angle of substantially 120°.

Optionally, the second leg portion terminates in a second corner region which has an internal angle of about 90°.

Optionally, a blade section extends from the second corner region 153.

Optionally, a shaped return section of the slider casing is provided for covering and protecting the blade tip.

Optionally, the affixing means comprises at least one self-adhesive strip.

Optionally, the slider comprises two parts, wherein the two parts are connected by a living hinge and wherein the integral cutting tool is held between the two parts by location of the at least one detent in an aperture, dimple or recess provide on said parts.

Optionally, the slider comprises a rear opening at the end of the living hinge, and wherein at least a portion of the thumb tab extends through said rear opening outwardly of the slider casing.

According to another aspect of the disclosure, there is provided a method of opening and reclosing a container, the method comprising:

affixing an opening and reclosing device according to any of the relevant preceding paragraphs to a container;

deploying a cutting tool to create an opening in the container, the size, configuration and position of which opening is determined by the opening and reclosing device; and reclosing the opening formed in the container by utilizing a zip-locking mechanism of the opening and reclosing device.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described, by way of example only, with reference to the accompanying drawings, in which:

FIG. 6 is a cross-sectional view taken along the line AA shown in FIG. 2;

FIG. 7A is a perspective view of an opening and re-closing device according to an embodiment of the present invention, wherein a cutting tool is positioned ready for cutting;

FIGS. 7B, 7C and 7D are top plan, cut-away and end-on cut-away views of the opening and re-closing device of FIG. 7A, wherein a cutting tool is positioned ready for cutting;

FIGS. 8A, 8B, 8C and 8D are perspective, top plan, cut-away and end-on cut-away views respectively of the opening and re-closing device of FIG. 7A, wherein a cutting tool has been moved into a stowed positioned, and wherein the zipper closure is operational for opening and reclosing a container, whilst the cutting tool is safely stowed away;

FIGS. 9A and 9B are perspective views of the outside of a slider of FIG. 7A, which is formed of two, hingedly connected sections, and which is shown in an unassembled or open state;

FIGS. 9C and 9D are top plan and bottom plan views of the unassembled or open state slider shown in FIGS. 9A and 9B;

FIG. 9E is a perspective view of the inside of the slider of the device of FIGS. 7A to 9B, which is formed of two, hingedly connected sections, and which is shown in an open state and with the cutting tool positioned in a "cutting position";

FIGS. 11A, 11B, and 11C are side, cross-section and perspective views respectively of an opening and re-closing device according to various embodiments, wherein a cutting tool has been moved down into a deployed position, ready for cutting;

DETAILED DESCRIPTION

Figure 1:
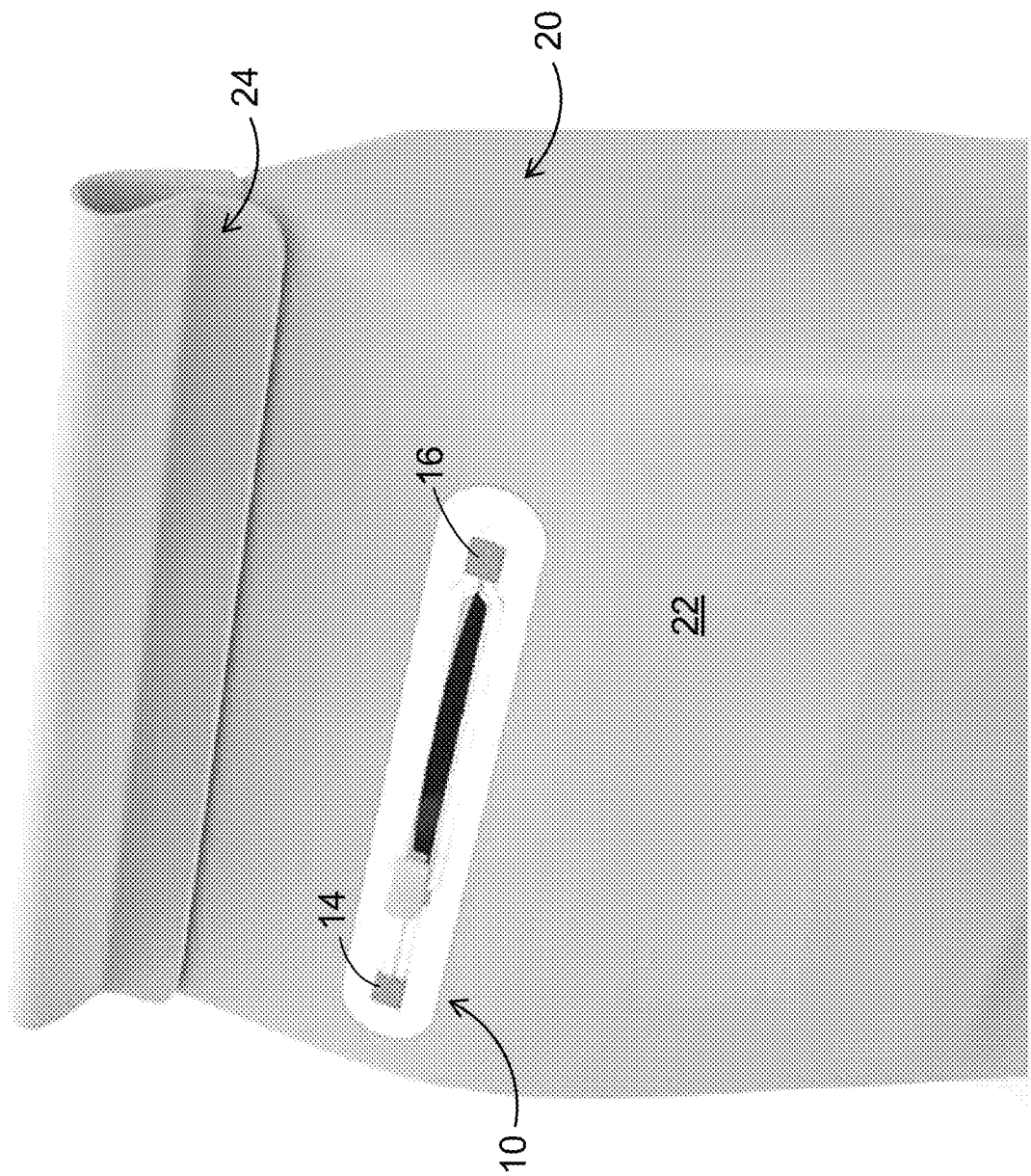
FIG. 1 is a perspective view of a container of prior art GB 252870 having an opening and reclosing device affixed thereto, wherein the opening and reclosing device has been used to cut an opening in the container and a zip-locking mechanism is being used to re-close that opening.

Detailed descriptions of specific embodiments of the opening and reclosing devices, methods and containers of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the opening and reclosing devices, methods and containers described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Examples of containers that may be used with the opening and re-closing device described herein include, without limitation sacks, bags, pouches (self-standing and non-self-standing), cartons and boxes and the like. Such containers may, for example, be formed from a single sheet or single ply or material, may comprise lamination, and/or may include any combination or any one of the following materials: plastics material, such as but not limited to PE (polyethylene), PET (Polyethylene terephthalate); PA (polyamide) and BOPP (biaxially oriented polypropylene); paper; kraft board; paperboard; cardboard; fiberboard; lightweight card; metal, such as aluminum; and one or more lining layers, such as a foil, for example, but not limited to aluminum foil and other metallic foil as well as plastics film and the like. Typically, such containers may comprise more than one layer of material in order to enhance the barrier properties of the container to minimize the ingress of air and other contaminants in order to preserve product freshness and extend the shelf life of product held by the container. Optionally the outermost surface of the container may comprise a printable surface such that high-quality graphics (product name, branding and logos; product information; and the like) can be printed directly onto the container.

The opening and re-closing device of the present disclosure finds particular beneficial application in bulk-quantity packages where the contents are not used or consumed straight away, but rather are consumed or used over a longer period of time such that maintaining the freshness of the product contained in the package and securing the product within the container become relevant concerns. Such bulk packages may include large (for example 10 kg) plastic sacks of pet food, multi-packs of frozen foods such as chicken breasts, and plastic sacks or bags of compost. The opening and re-closing device may nevertheless serve a beneficial purpose on smaller packages, especially for aiding opening of the package to make it more senior and/or user friendly and in dependence on a consumer's habits, some smaller packages may benefit from being securely reclosed if the contents are used slowly and kept for a period of time.

For efficiency of explanation of the improvements taught herein, reference is first made to FIGS. 1 to 6, which are the FIGS. 1 to 6 of the prior art GB 2528720.

Referring to FIG. 1 there is shown a container 20 suitable for use with an opening and re-closing device 10 (also referred to herein as "device 10"). In the illustrated embodiment, the container 20 is a polyethylene plastic sack comprising dry pet food (not shown). The container has an outer surface 22 that, for clarity of illustrating the invention, is shown without any printed graphics or indicia thereon. The container 20 is optionally not provided with its own opening aid or reclosing means, however the container 20 does comprise its own integral closure 24, in the form of a fold-over type closure, that securely closes the container 20 before use. The opening and re-closing device 10 is shown as having been affixed to the container 20 and in use to cut an opening 'O' through the container 20. The size and position of the opening 'O' is determined by the size and position of the opening and re-closing device 10. In this way, the opening and re-closing device 10 can be used to securely re-close the opening 'O' that in the first instance it was used to form, such that product (not shown) within the container 20 can be easily and repeatedly accessed and such that the container 20 can be easily and repeatedly securely closed and resealed.

Figure 2:
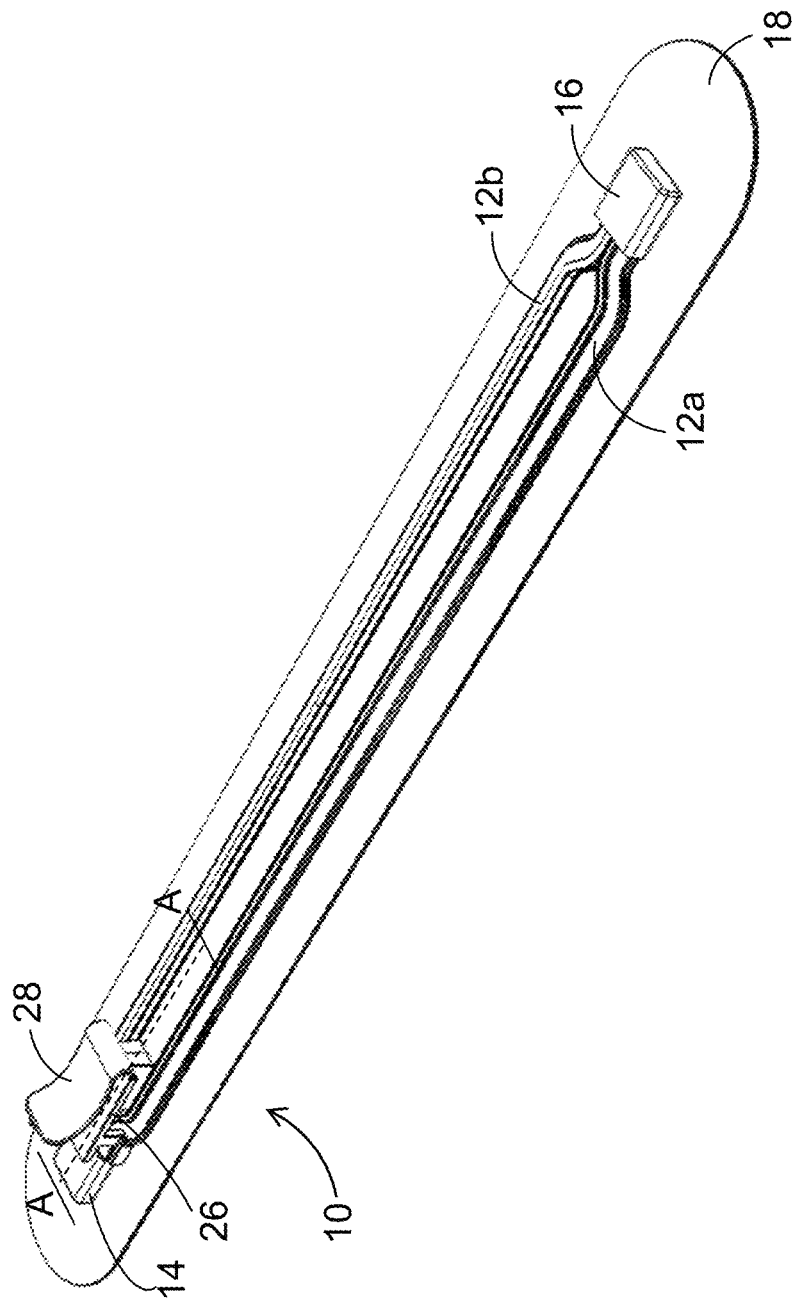
FIG. 2 is a perspective view of an opening and reclosing device such as that shown in FIG. 1, the device is illustrated prior to being affixed to a container.

In FIG. 2 a perspective view of the opening and re-closing device 10 is shown prior to its deployment on a container 20. With reference also to FIGS. 3 to 6 it can be seen that the opening and re-closing device 10 comprises an affixing means 18 optionally in the form of a self-adhesive strip 18 for affixing the opening and reclosing device 10 to the container 20. A backing paper 36 is provided to protect the adhesive strip 18 to preserve its adhesive quality prior to being used. The backing paper 36 is preferably sized and shaped similarly to the adhesive strip 18 and may comprise an easy removal feature, such as but not limited to a cut line or tab.

An integral cutting means 30 is provided for creating the opening 'O' in the container 20 in a prescribed manner such that a zip-locking mechanism (also referred to as a plastic fastener) can be used for re-closing the created opening 'O' for re-securing products within the container 20 and/or for preserving product freshness. The zip-locking mechanism is preferably a plastics construction. Many plastic fasteners or plastic zip-locks are known, the operating principle of which may be suitable for use in the device 10 of the present disclosure, albeit with modification to enable the integral cutting tool 30 to be housed at least in part, within the slider 26.

Optionally, the zip-locking mechanism comprises a first zip track 12a and a second zip-track 12b. The first and second zip tracks 12a, 12b are adjoined at each end and are enclosed at each end substantially by first and second end stops 14, 16 respectively. The first zip track 12a and a second zip-track 12b run substantially parallel to one another and can be interconnected or otherwise mated together to form a seal over the opening 'O' and can be separated apart by a slider 26 to provide access to the opening 'O'. The slider 26 is shaped such that a bottom runner on each of a first slider part 26a and a second slider part 26b slots or fits about the first and second zip-tracks 12a, 12b (as best seen in FIG. 3) for operating the zip-locking mechanism.

On top of and affixed to the slider 26 is a pull tab 28. In some embodiments the pull tab 28 is an integral formation with the slider 26. The pull tab 28 is curved upwardly away from a top surface of the slider 26 to permit easy gripping of the pull tab 28 and to provide a degree of resilient bias.

Figure 3:
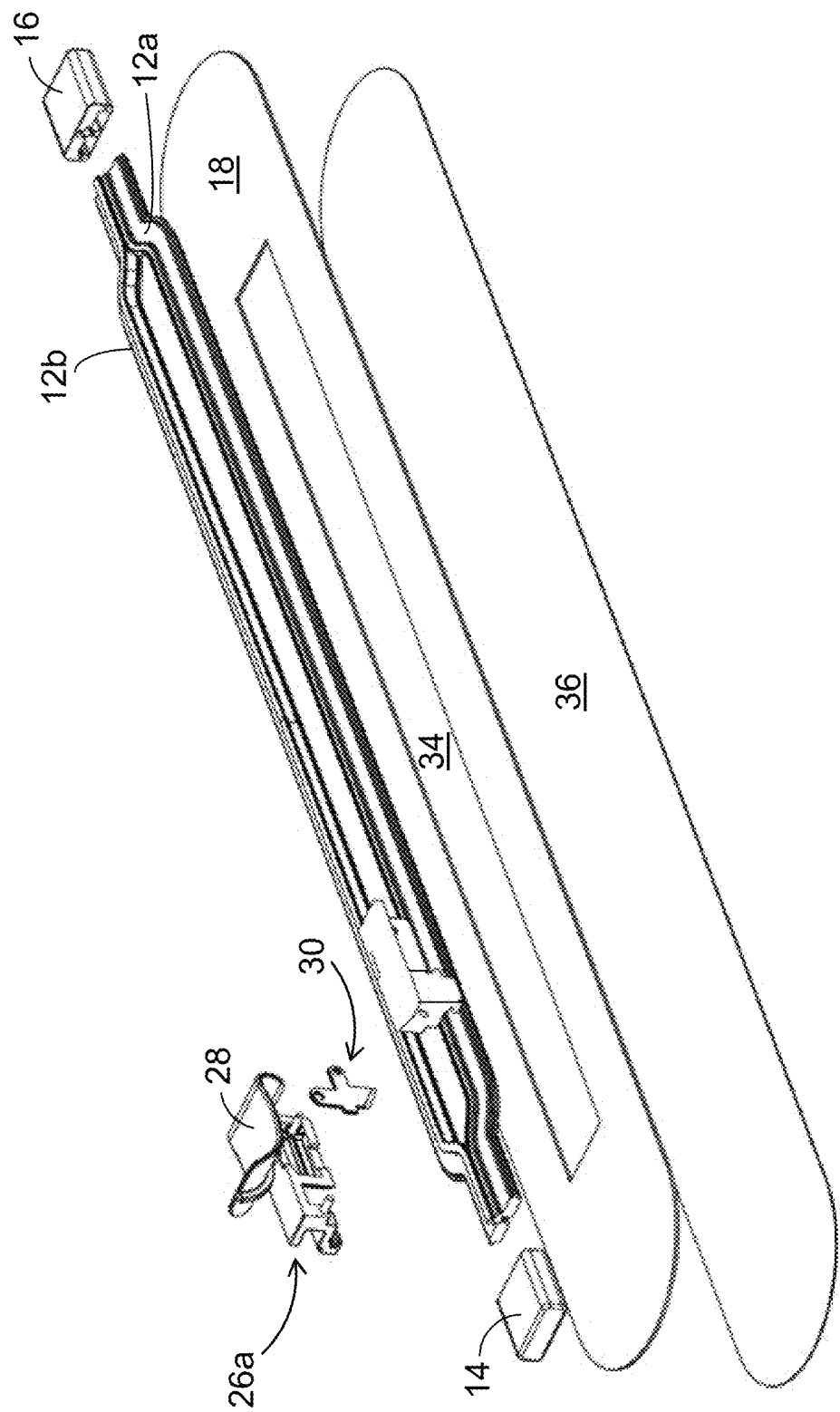
FIG. 3 is an exploded view of the opening and re-closing device shown in FIG. 2 illustrating the component parts of the device.
Figure 4:
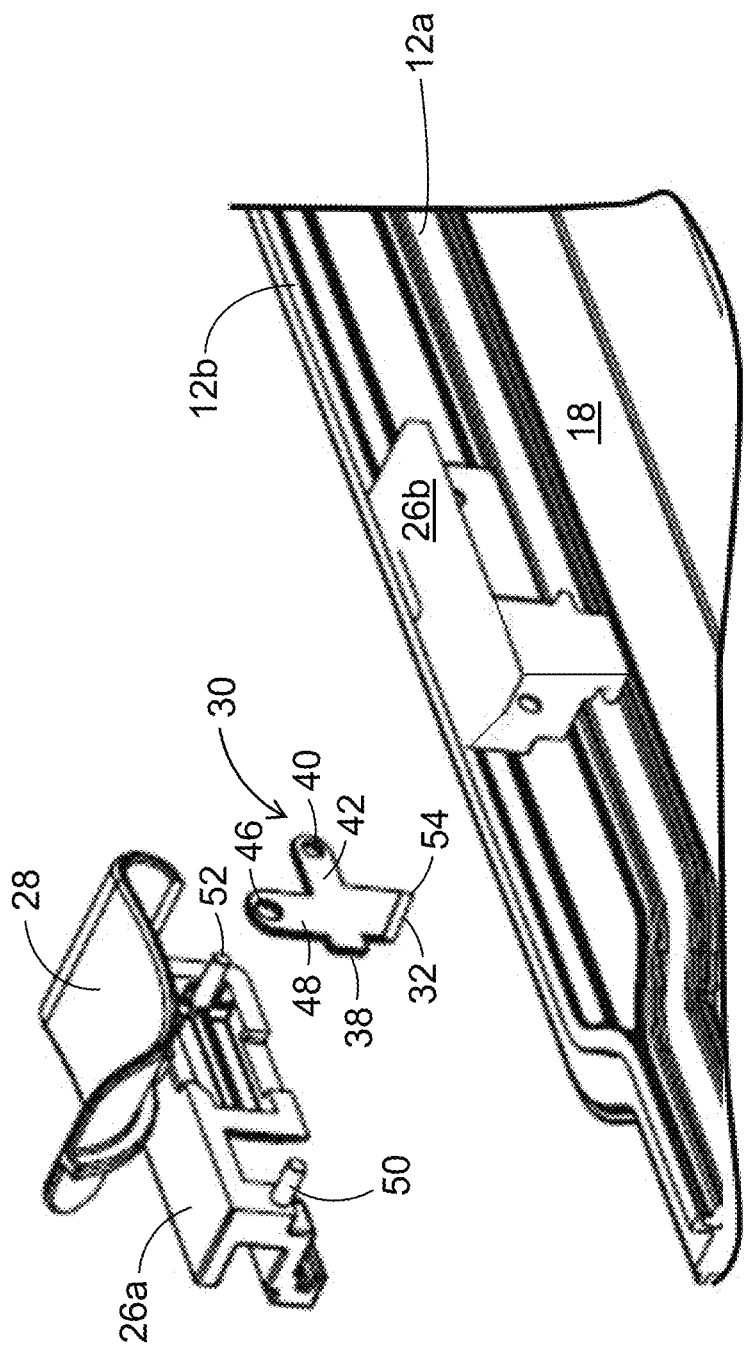
FIG. 4 is an enlarged view of part of the illustration of FIG. 3 showing in close-up view a cutting means of the opening and re-closing device.
Figure 5:
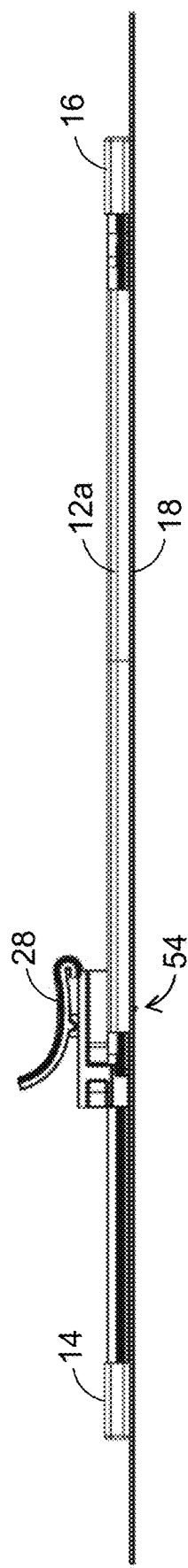
FIG. 5 is a side view of the opening and re-closing device shown in FIG. 2 wherein a slider and a pull-tab coupled thereto have been moved away from a first stop during a cutting and opening operation.
Figure 10:
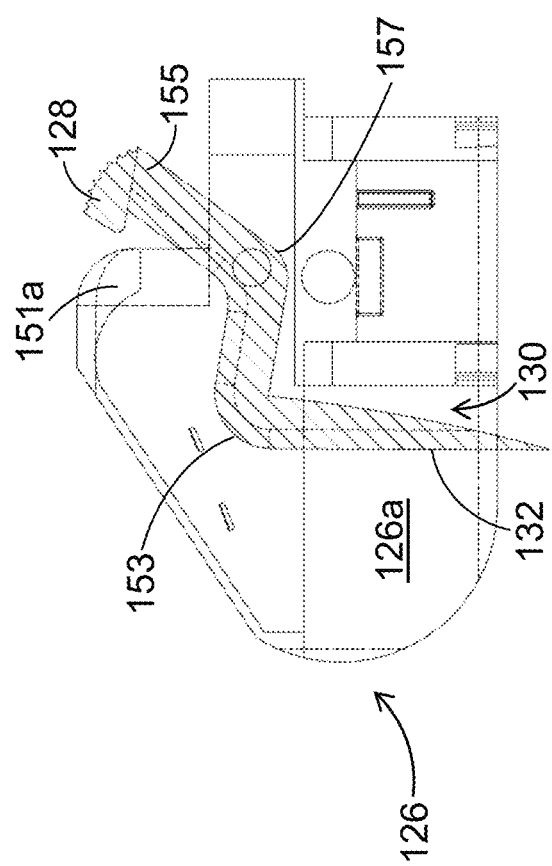
FIG. 10 is a plan view of the inside of part of the slider, of a device according to various embodiments, in an open state showing the location that the cutting tool will adopt once the slider is assembled and the cutting tool is in a deployed position.

Referring now to FIG. 3 and in particular to FIG. 4, the integral cutting tool 30 in the form of a cutting tool 30 housed within the slider 26 is shown. The slider 26 is optionally a two-part construct, the two parts 26a, 26b of which are connectable together by means of one or more complementary fixings such as a connecting peg 50 and corresponding bore or aperture into which the connecting peg 50 mates with a secure friction fit. In FIG. 4 a first slider part 26a is shown with the pull tab 28 affixed thereto. A second slider part 26b is shown adjacent in position on the first zip track 12a. The first and second slider parts 26a, 26b are shaped and constructed to house the cutting tool 30. The cutting tool 30 has a blade 32 with a tip 54 which can be moved between a stowed position in which all or substantially all of the blade 32 of the cutting tool 30 is housed within the confines of the slider 26; and a deployed position in which at least a portion of the blade 32 or blade tip 54 is exposed below a bottom plane of the slider 26 so that the blade 32 and/or blade tip 54 can pass into and through a surface 22 of the container 20 for creating the opening 'O'.

Optionally and as shown in FIGS. 4 and 6, the cutting tool 30 comprises first and second legs 48, 42, that are positioned substantially perpendicular to one another. The first leg 48 comprises a first aperture 46 formed therein. The second leg 42 comprises a second aperture 40. The first and second apertures 46, 40 are circular in shape and can be used to slide the cutting tool 30 onto first and second pivot pegs 56, 52 respectively. The first pivot peg 56 is coupled to the pull tab 28; the second pivot peg 52 is housed within the slider 26. The cutting tool 30, by virtue of the pivotal connections provided by the first and second pivot pegs and apertures 46/56, 40/52 can move, albeit in a restricted manner. A stop 38 provided as a shoulder, projection or extension of the second leg 42 of the cutting tool 30, catching on the internal shape of the first and/or second slider part 26a, 26b, helps to limit and control the extent of movement of the cutting tool 30. A generally downward and slightly forward force applied to the pull tab 28 lowers the position of the first pivot peg 56 and causes a rotation of the cutting tool 30 (in a counter clock-wise direction when viewed in FIG. 6) about first and second pivot pegs 56, 52. This permits part of the blade 32, including the blade tip 54, to move into the deployed position where cutting through the container 20 to create the opening 'O' can be commenced. Beneficially, the angle of the blade 32 (about 45°) is formed in a complementary manner to the manner in which the cutting tool 30 rotates so that the blade 32 moves into an effective cutting position for the direction the cutting tool 30 will be moved in during a cutting stroke.

As the slider 26 is slid from the second end stop 16 towards the first end stop 14, the blade tip 54 is moved in a line between the first and second zip tracks 12a, 12b and the opening 'O' is formed. Without downward force applied to the pull tab 28, the cutting tool 30 is automatically retracted at least substantially if not entirely within the housing provided by the slider 26 such that the blade 32 is no longer projecting below the bottom plane of the slider 26. In this way, the blade 32 is returned to the stowed position and use of the container 20 can continue safely. Optionally, this is due to the resiliently biased pull-tab 28 springing back to its neutral position.

To close the created opening 'O', a user may pull slightly upwardly as indicated by the upwardly curved nature of the pull tab 28 and back toward the second end stop 16. This action operates the slider 26 which interlocks or otherwise reconnects the first and second zip tracks 12a, 12b, which then form a sealed closure over the opening 'O'. The container 20 is then re-closed and re-sealed so that product remaining within the container 20 is held securely without being able to exit through the opening 'O' and its shelf life is preserved because the ingress of air and other contaminants through the opening 'O' is limited or restricted.

Referring now to FIGS. 7A-10; 11A-12C; and 13A-13C, there is shown additional embodiments of the present invention. In the second, third and fourth illustrated embodiments, like numerals have, where possible, been used to denote like parts, albeit with the addition of the prefix "100", "200", "300" and so on to indicate that these features belong to the second, third and fourth embodiments. The alternative embodiments share many common features with the first embodiment and therefore only the differences from the embodiment illustrated in FIGS. 1 to 6 will be described in any greater detail.

FIGS. 7A-10 show a device 110 which is a more slimline structure and in which features are provided to ensure good engagement of the cutting tool 130 with the surface to be cut; and to enable the cutting tool 130 to be stowed carefully away after use without interference with the opening and re-closing zip-mechanism 112a, 112b.

In FIGS. 7A to 7D, the cutting tool 130 is shown in a deployed position, wherein the blade 132 or blade tip 154 is exposed below a bottom plane of the slider 126 so that the blade 132 and/or blade tip 154 can pass into and through a surface (not shown) of a container (not shown) for creating an opening 'O' (not shown).

In FIGS. 9A to 9E, the slider 126 of the device is shown in various views to illustrate its slimmer form and to illustrate the manner in which the cutting tool 130 is shaped and held therein.

As can be seen in the aforementioned Figures, an in particular, in FIGS. 9A-9E, the slider 126 is a single piece having first and second parts 126a, 126b that are linked together by a living hinge 160. Advantageously, having first and second slider parts 126a, 126b linked by a hinge, such as a living hinge 160, in a plastic molded structure, assembly of the slider 126 is made more simple. Further beneficially, the slider 126 and cutting tool 130 are more easily assembled—this is especially so in view of the slider 126 having integrally formed within it, components for retaining and controlling movement of the cutting tool 130. The slider casing 126 comprises a rear opening at the end of the living hinge 160, and a thumb tab 128 extends through said rear opening outwardly of the slider casing.

Furthermore, and as best seen in FIGS. 7C, 8C and 9E, the cutting tool 130 is shaped quite differently to the cutting tool 30 of the first illustrated arrangement. More specifically, and with reference to FIG. 8C, it can be seen that the cutting tool 130 has a first leg 148 a first end of which terminates in the integrally molded thumb tab 128. Optionally, the thumb tab 128 is contiguously and integrally formed with the first leg 148. Optionally the thumb tab 128 is generally segment shaped. Optionally the thumb tab 128 comprises a textured surface, for example, the thumb tab 128 may be ridged or otherwise formed to provide improved grip between a user's finger or thumb and the thumb tab 128. A user can operate the thumb tab 128 to control the movement of the cutting tool 130.

Referring again to FIG. 8C, the first leg portion 148 is generally parallel with the zip-mechanism 112a, 112b, when the cutting tool 130 is in its stowed state, wherein it is disposed within the slider 126. At a second end of the first leg portion 148, the cutting tool 130 comprises means for pivotally coupling the cutting tool 130 to the slider casing 126. In this arrangement, means for pivotally coupling the cutting tool 130 to the slider casing 126 comprises at least one peg 152 or detent 152 which protrudes from at least one side of the cutting tool 130. The at least one peg 152 optionally comprises two pegs 152, one on either side of the cutting tool 130. Each peg 152 is located in, and held in, a recess, dimple or aperture 146a, 146b provided on the first and second slider parts 126a, 126b respectively. In this way the cutting tool can rotate about the two pegs 152 and is restricted from lateral or longitudinal movement.

The pegs 152 extend outwardly from the plane of a main body portion of the cutting tool 130 at a corner region or bent region 157 of the cutting tool 130. Optionally, the internal radius of curvature θ of the corner region 157 may be about 120°. See FIG. 7C. It will be appreciated that the angle θ may take a range of values and is not limited to being about 120°. Optionally, the internal radius of curvature θ of the corner region 157 may be between about 90° and about 140°.

A second leg portion 142 extends from the corner region 157. Accordingly the first and second leg portions 148, 142 are spaced by a round curved corner having a radius of curvature of about 120°.

The second leg portion 142 terminates in a second corner region 153 which has an internal angle of about 90°. See for example FIGS. 7C, 8C, 9E and 10. From the second corner region 153, a blade section 155 extends (see FIG. 8C). The blade section 155 has a bladed edge 132 and terminates in blade tip 154. As shown in FIG. 8C, the slider casing 126b is shaped such that when not in use, the cutting tool 130 is stowed within the slider casing 126b with the blade edge 132 safely stowed against a raised rim of the slider casing 126b; and with the blade tip 154 covered and protected by a shaped return section 161 of the slider casing 126b.

As can be seen in the Figures, more specifically FIGS. 7A, 7C, 8A, 8C, 9E and 10, the slider casing 126 is shaped, at least in part to be complimentary in form to the shape of the cutting tool 130. This is best seen in FIGS. 8A and 8C where the cutting tool 130 is illustrated in its stowed position. The thumb tab 128 sits outside of the slider casing 126, and the first leg portion 148 sits beneath a first wall 151b of the casing 126. A first wall 151b of the casing 126 has an internal shape that follows the contour of the second leg portion 142, second corner region 153 and blade 132. As already described, the blade tip 154 is covered and protected by a shaped return section 161 of the slider casing 126b (see FIG. 9E).

When the cutting tool 130 is deployed, a user operates the thumb tab 128 to cause the cutting tool 130 to rotate about peg 152. The range of movement of the thumb tab 128 is limited by the first wall 151b (see FIG. 7C). At that limit or stop, the blade tip 154 is presented in a substantially perpendicular position relative to the material it is to cut through. The thumb tab 128 can be used to slide the blade 154 between the slider tracks 112a, 112b. The first and second parts 126a, 126b of the slider casing 126 sit partially on top of and partially either side, on the outside, of the sider tracks 112a, 112b, such that the slider casing 126 can be moved along the zip track with the blade tip 154 cutting an opening. The blade guided by the tracks cuts a straight opening.

The cutting tool 130, by virtue of the pivotal connection provided by the at least one pivot peg 152 and aperture(s) or dimple(s) 146a, 146b, can move, albeit in a restricted manner. The range of motion of the cutting tool 130 is limited by the thumb tab 128 contacting an outer, upper section of the slider 126b; and by the blade edge 132 contacting an inner rim 170 of the slider 126b.

The two hinged parts 126a, 126b of the casing allow for it to be easily assembled, with the pivot pegs 152 of the cutting tool 130 seating easily in apertures 146a, 146b, the slider parts can be snap fitted or clipped together, about the two slider tracks 112a, 112b. In this way, alignment of the blade between the tracks 112a, 112b and good position of the blade tip 154 relative to the material being cut can be achieved, simply, quickly and easily.

Referring now to FIGS. 11A-12C a further device which is also a more slim line structure (compared to the embodiment illustrated in FIGS. 1 to 6) is shown. The device comprises a curved blade and a less "dog-leg-shape" compared to the second embodiment. Whilst not wanting to be limited to any particular theory, it is suggested that when cutting certain materials a straight blade, some of the time, may drag against the material, wherein the material may bunch up and crease rather than be cut. This problem may not present with all types of material or all of the time, but to mitigate against such a problem occasionally occurring, it is suggested that there may be an advantage to curving the shape of the cutting tool 230 as shown in FIGS. 11A-12C.

In FIGS. 11A to 11C, the cutting tool 230 is shown in a deployed position, wherein the blade 232 or blade tip 254 is exposed below a bottom plane of the slider 226 and ziptracks 212a, 212b. In this way, the blade 232 and/or blade tip 254 can pass into and through a surface (not shown) of a container (not shown) for creating an opening 'O' (not shown).

Figure 12A:
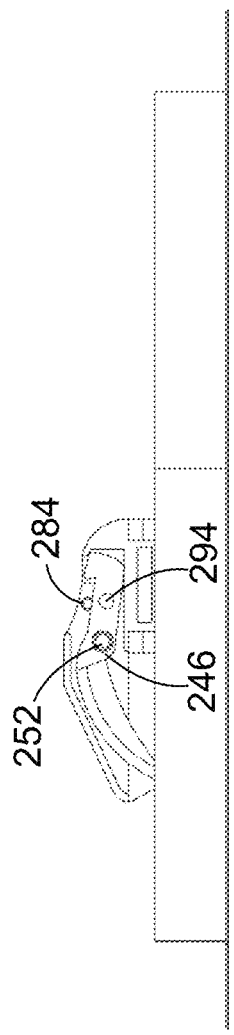
FIGS. 12A, 12B, and 12C are side, cross-section and perspective views respectively of the opening and re-closing device of FIGS. 11A, B and C, wherein the cutting tool has been moved into a stowed positioned, and wherein the zipper closure is operational for opening and reclosing a container, whilst the cutting tool is safely stowed away.
Figure 12B:
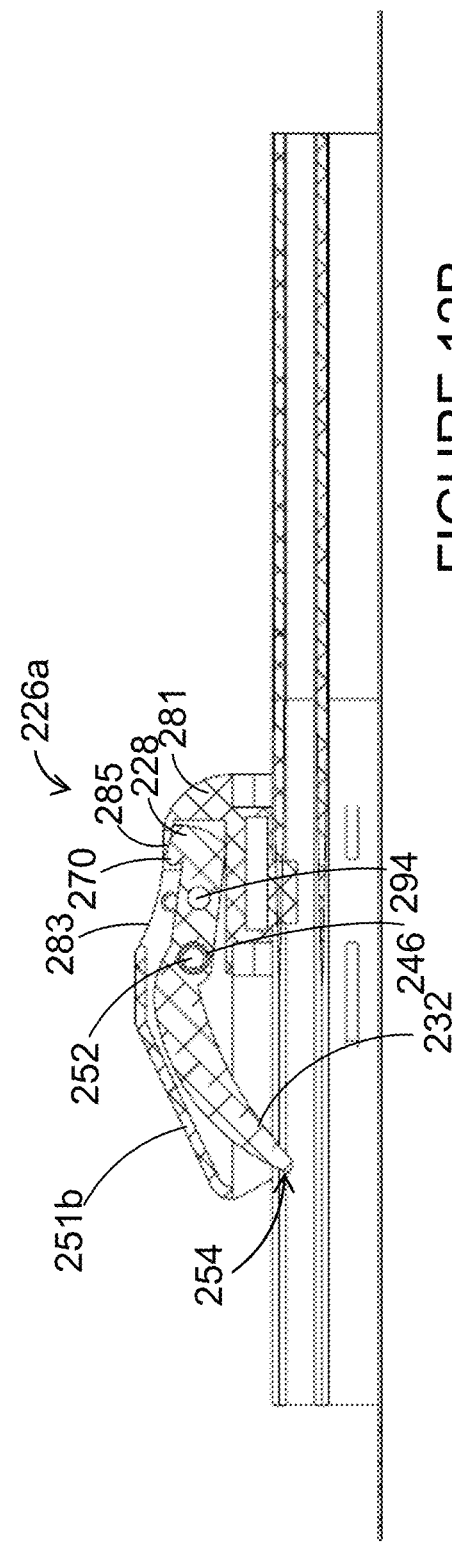
Figure 12C:
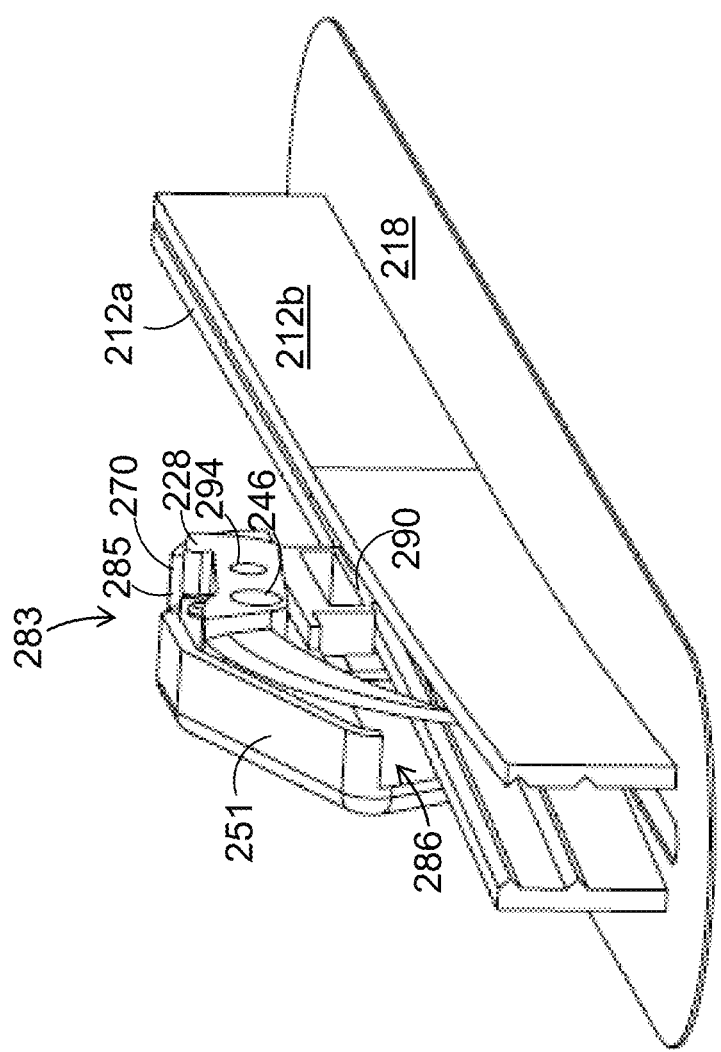
Figure 12D:
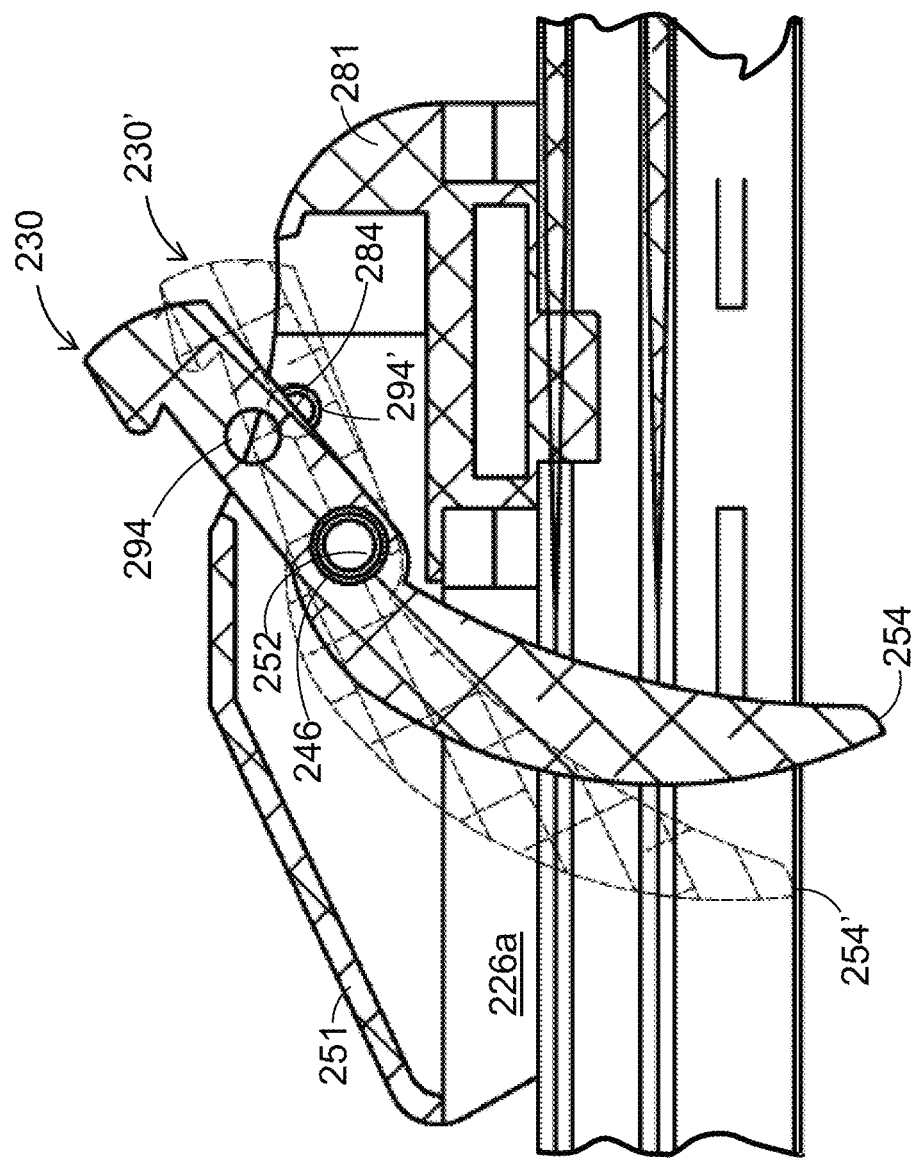
FIG. 12D is a cross-sectional view of the opening and re-closing device of FIGS. 11A to 12C, wherein the cutting tool is shown moving between a securely stowed position and a "slider-only" position.
Figure 13A:
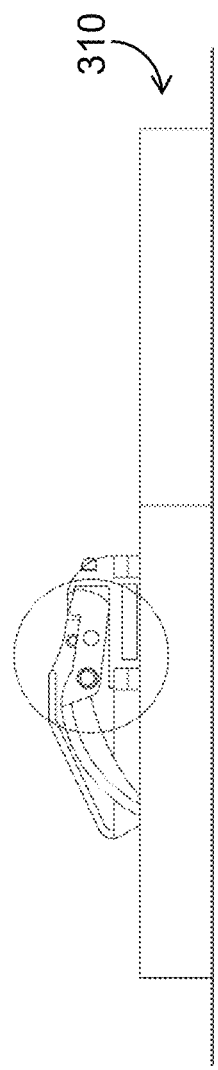
FIG. 13A is a side view of an opening and re-closing device according to various embodiments, wherein a cutting tool is positioned ready for cutting.
Figure 13B:
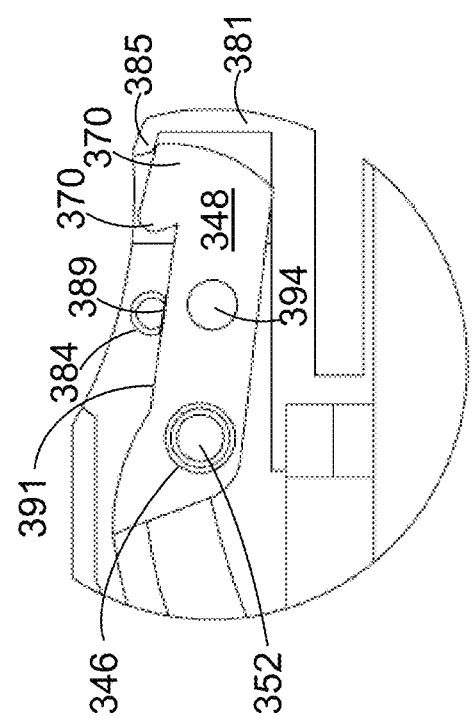
FIG. 13B is an enlarged view of part of FIG. 13A.
Figure 14:
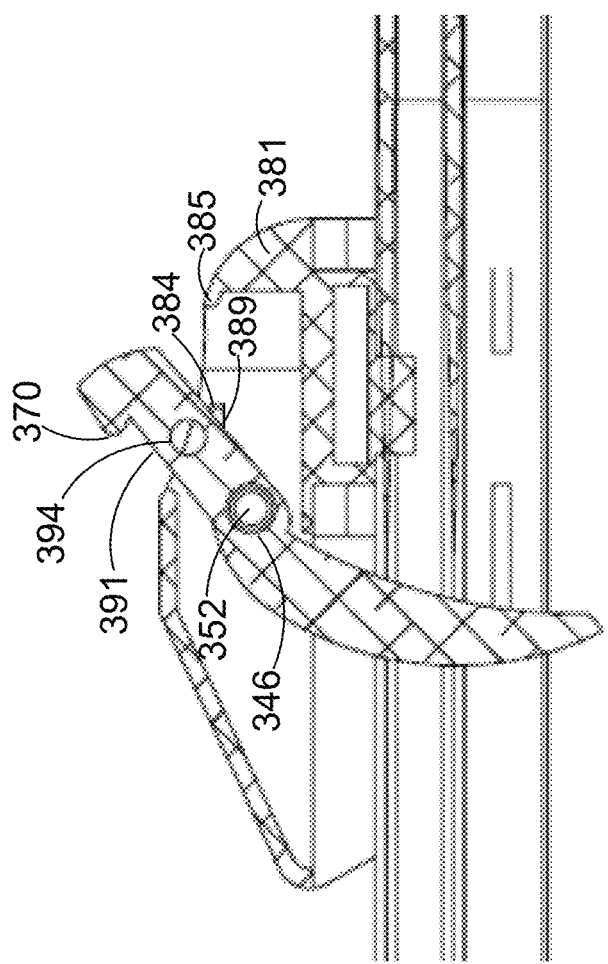
FIG. 14 is a cross-sectional view of the opening and re-closing device of FIGS. 13A and 13B showing a nipple on the slider having a blunt edge.
Figure 15:
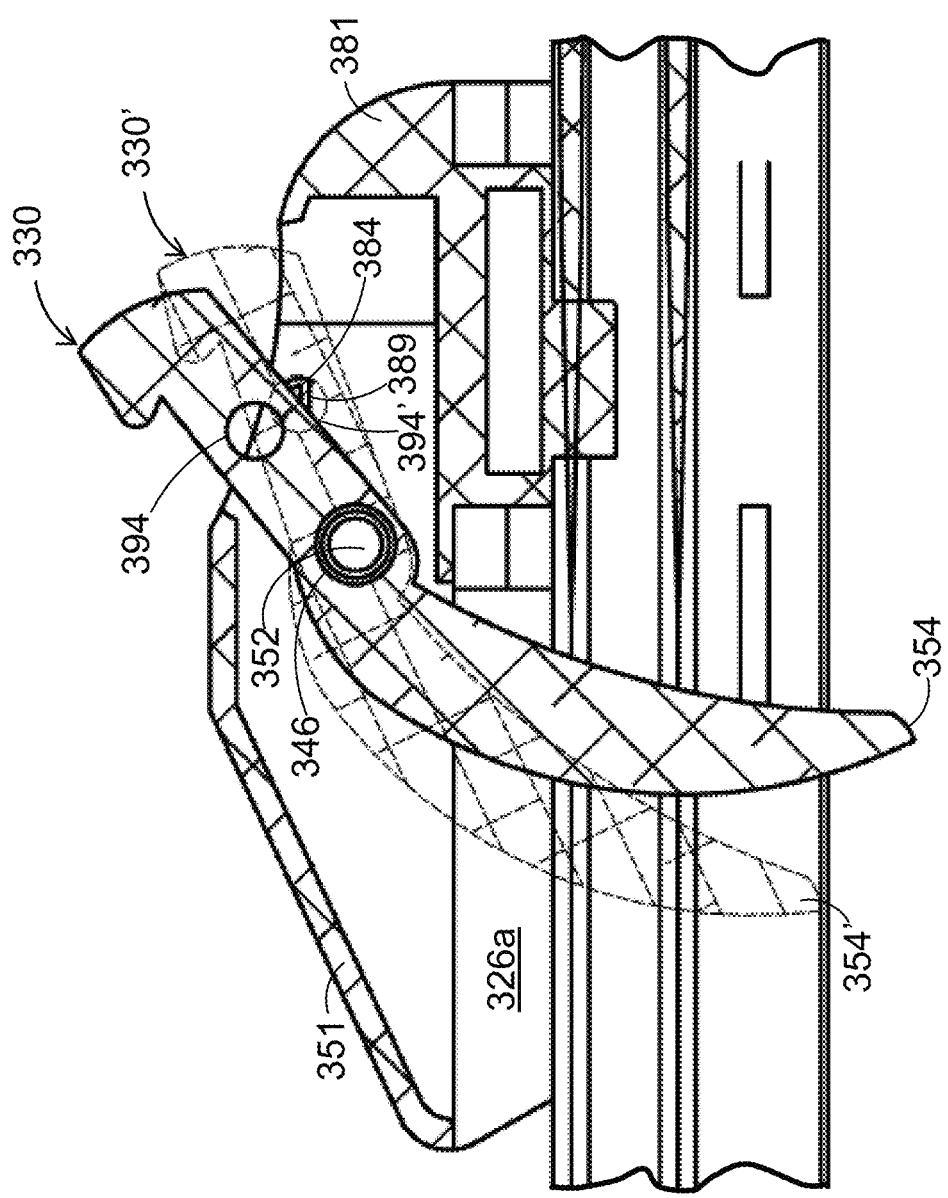
FIG. 15 is a cross-sectional view of the opening and re-closing device of FIGS. 13A to 14, wherein the cutting tool is shown moving between a securely stowed position and a "slider-only" position, and wherein the nipple having a blunt edge can be seen.

In FIGS. 12A to 12C, the slider 226 of the device is shown in various views to illustrate its slimmer form and to illustrate the manner in which the cutting tool 230 is shaped and held therein. The cutting tool 230 is positioned, located and held within the slider such that it can move pivotally between a stowed position wherein the blade 232, 254 is safely stored; to a "slider-only" position wherein the blade 232, 254 is stowed and yet the thumb tab 228 is exposed out of the slider for use; and to a deployed position, wherein the blade tip 254 is positioned for cutting.

The slider 226 may be of a two-piece construction having first and second parts 226a, 226b that snap-fit or clip together by means of complimentary formed moldings on the two parts 226a, 226b. Assembly of the slider 226 is still relatively simple. At least one detent 252, provided in this arrangement on an internal wall of the slider parts 226a, 226b is located within a dimple, recess or aperture provided on said cutting tool 230. The slider parts 226a, 226b are then pressed fitted together. One or both of the slider parts 226a, 226b comprises a runner 290, which is clipped onto the zipper tracks 212a, 212b either before during or after assembly of the slider 226.

As shown in FIGS. 12B and 12C, the slider 226 has a first wall portion 251 which runs from a first open end 286 of the slider 226 alongside and spaced from the curved blade portion 232 of the cutting tool 230, and to an opening or aperture 283. On the other side of the opening or aperture 283, there is a second wall portion 281, which has an internal shaped edge 285 which is used to catch at least a portion of the thumb tab 228. The cutting tool 230, once stowed, can be retained in the stowed position by the mechanical catch between internal shaped edge 285 and portion of the thumb tab 228. As shown, the thumb tab 228 may have a lipped portion 270 which may catch under the internal shaped edge 285 in order to secure the cutting tool 230 in the stowed position.

By manipulation of the lip portion 270 and therefore of the thumb tab 228 relative to the internal wall catch 285, the thumb tab 228 can be released from engagement with the internal wall catch 285 and the cutting tool 230 can be unlocked and is substantially free to rotate. The thumb tab 228 and at least part of the first leg portion 248 can be moved upwardly, through the opening 283 and outwardly of the slider 226.

A range of pivotal movement of the cutting tool 230 is restricted by the shape, position, structure and configuration of internal edges of the slider walls 226a, 226b and external surfaces and edges of the slider walls 226a, 226b.

Additionally, a nipple, detent or raised portion 284 extends or protrudes from an inside surface of a slider part 226a, 226b. Optionally the nipple 284 is a circular bump, protrusion or detent. In other arrangements, the nipple may take a different shape or form or may be omitted. Beneficially however, once the cutting tool 230 is released from the catch 285, the first leg portion 248 of the cutting tool 230 can freely move up to the nipple 284. A user needs to apply a deliberate additional force to push the first leg portion 248 either onto or past the nipple 284 such that the blade 232/254 can be deployed. As such the nipple 284 provides an optional safety feature in that a user must release the thumb tab 228 from the catch 285 and then must deliberately force the tool 230 past the nipple 284 before the blade 254 is exposed below the plane of the track 212a/212b. Once the first leg portion 248 is pivoted beyond the nipple 284, it can rotate until it contacts a free edge 257 of the first wall 251. This is best illustrated in FIG. 11C. In this position, the cutting tool 230 is arranged for cutting and the blade tip 254 protrudes below the track 212a, 212b (See FIG. 11B).

By gripping the thumb tab 228 (optionally by catching their thumb on lipped portion 270), a user can slidingly move the slider 226 along the track with the blade 232 disposed between and slightly below the track parts 212a, 212b (see FIGS. 11A-C). An opening can thereby be cut.

Thereafter, the thumb tab 228 can be returned to a fully stowed and locked position wherein the first leg portion 248 and thumb tab 228 are disposed within the confines of the slider casing 226—see FIGS. 12A-12C.

Between the "fully stowed" position and "blade in-use" position, the cutting tool 230 can be held in a "slider-only position". In this position (shown in FIG. 12D—see cutting tool 230' depicted in dashed line), a second aperture, recess or dimple 294', provided in the first leg portion 248' can be pushed onto the nipple 284 of the slider 226a in order to "lock" the cutting tool 230' in a position wherein the thumb tab 228 is out of the opening 283 and accessible for use to move the slider 226 for opening and re-closing the zip 221a/221b and yet the cutting blade 232' and its blade tip 254' are disposed sufficiently out of the way such that the blade 232'/254' will not cut through any more material and such that the device is fully safe to use without any risk of injury to the user.

In yet a further illustrated embodiment shown in FIGS. 13A to 16, the nipple 384 is not a fully circular detent or bump; but rather has a blunt edge 389 which is aligned with part of a top edge 391 of part of the first leg portion 348 of the cutting tool 330. Beneficially, when the tool 330 is located in the fully stowed position, the lipped edge 370 of the thumb tab 328 catches on edge 385; and part of an edge 391 of the first leg portion 348 catches on the blunt edge 389 of the nipple 384 thus providing two independent locks for the cutting tool 330. This makes the stowed position of the blade even more secure.

Figure 16:
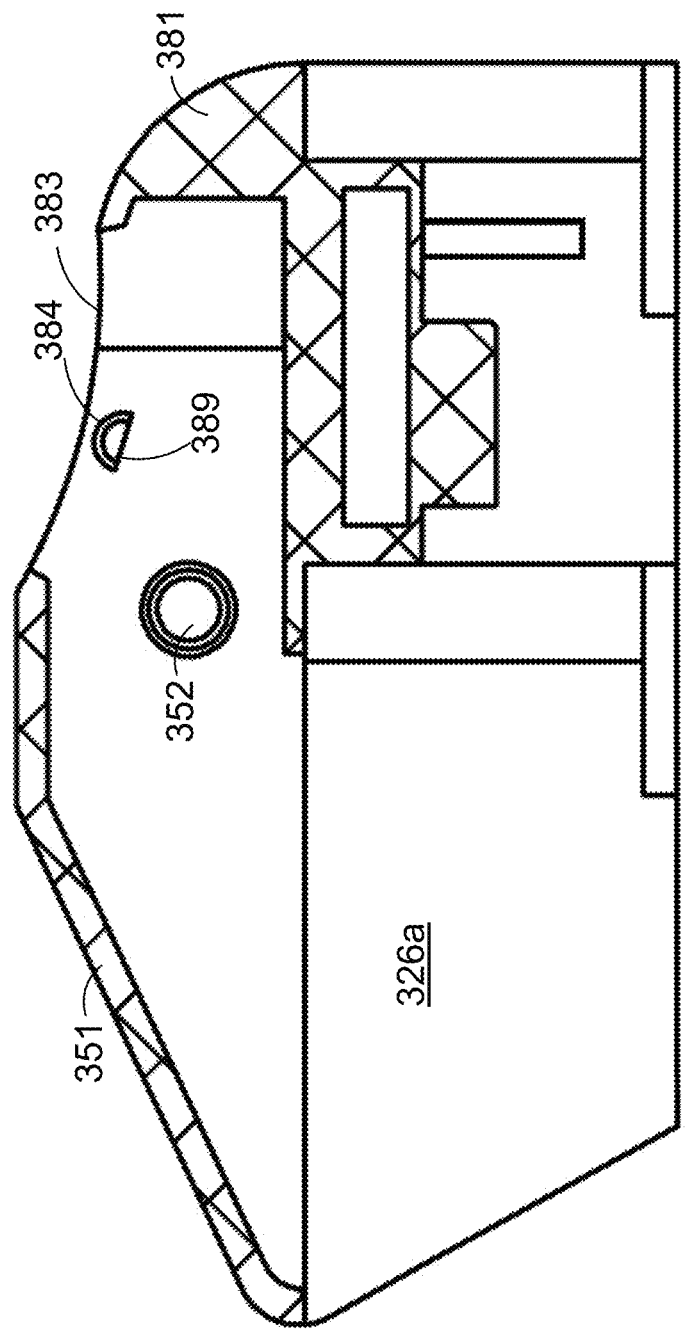
FIG. 16 is a plan view of the inside of the slider, showing at least one detent of a coupling means for pivotally connecting the cutting tool to the slider; and showing a blunt edged nipple for catching the cutting tool and maintaining it in a "slider-only" position.

In FIG. 16, a slider part 326a is shown and it can seen that a first detent 352 protrudes from the slider casing for receiving a complimentarily formed aperture, recess, dimple or indent provided on the integral cutting tool 330 (now shown in FIG. 16). Additionally, the relative size, shape, position, angle and engaging edge 389 of nipple or catch 384 can be clearly seen. An aperture, dimple, recess or indent 394 provided on the cutting tool 330 (see FIG. 15) catches on or sits on the nipple 384 to hold the cutting tool 330' in a slider only position. The shape of the nipple 384 in this arrangement enables part of an edge 391 of the first leg portion 348 to catch on the blunt edge 389 of the nipple 384 thus providing two independent locks for the cutting tool 330.

It can be appreciated that various changes may be made within the scope of the present invention, for example, in other embodiments of the invention it is envisaged that a different zip-locking mechanism may be used to that shown herein and in some embodiments, it is envisaged that the zip locking mechanism is not formed from plastics material, though for cost reasons, plastics material is a preferred option.

In some embodiments, the blade and part of the cutting tool is housed or sandwiched between two solid side walls, optionally one formed from the first slider part and the other provided by the second slider part. The side walls may provide an extension of the slider depending below the plane of the bottom of the slider shown in the first embodiment and may be angled at a distal end, optionally at about 45° and in complementary manner to the angle of the blade 32. In this way the cutting tool and blade is protected or shielded on both sides and only a small part of the cutting tool, including the blade and blade tip is exposed below the distal end of the side walls when the cutting tool is deployed and at all other times, the cutting tool is contained and protected for additional safety.

In some embodiments, after a first cutting use, the cutting tool is brought up into a locked and stowed position to mitigate against any possible injury during subsequent use of the container. This may be achieved by pulling on the pull tab and rotating the cutting tool up into the housing provided by the slider and by a catching mechanism (not shown) thereby being activated to catch, engage or otherwise lock the cutting tool in the locked and stowed position.

In some embodiments, it is envisaged that the second end stop may be provided with a housing and the cutting tool is moved after a first cutting use out of the slider and into the second end stop, wherein the cutting tool is disposed in a stowed and locked position where the blade cannot be accessed again. In such embodiments, the cutting tool may not necessarily be hooked onto pivot pegs provided within the slider.

As such it will be appreciated that the size, shape, configuration, manner of attachment and manner of deployment of the cutting tool may differ from that illustrated herein.

The opening and re-closing device may take various sizes, shapes and configurations, and is not necessarily limited to being suitable for forming a single straight line opening. For example, in some embodiments, the opening and re-closing device is "L"-shaped or "U"-shaped and in some arrangements, the opening and re-closing device is attachable around one or more corners. Where the device is attached around two corners, the opening 'O' and zip closure may create a lidded portion of a container.

What is claimed is:

1. An opening and reclosing device for a container, the opening and reclosing device comprising: an affixing means for affixing the opening and reclosing device to a container; an integral cutting tool for creating an opening in the container in a prescribed manner; and a zip-locking mechanism for re-closing the created opening, the zip-locking mechanism comprising a slider, characterized in that the integral cutting tool is a single unitary piece comprising: a blade tip at a first end thereof, a thumb tab at a second end thereof; and a coupling means provided between the blade tip and the integral thumb tab at the first and second ends of the single piece cutting tool, wherein the coupling means provides for pivotal connection of the integral cutting tool to the slider, such that the integral cutting tool is pivotally moveable between: a first deployed position wherein the blade tip protrudes out of the slider for cutting an opening in a container; and a second stowed position; wherein the slider comprises at least one internal catch provided by a shaped internal wall of said slider, and the thumb tab comprises a lip portion which engages said internal catch for retaining the integral cutting tool in the second stowed position, and wherein the coupling means comprises at least one detent extending out of the plane of said integral cutting tool and wherein the slider comprises at least one aperture or recess for receiving said at least one detent or wherein the coupling means comprises at least one detent extending from a wall of said slider and disposed internally of said slider and wherein said integral cutting tool comprises at least one aperture or recess for receiving said at least one detent.

2. The opening and reclosing device according to claim 1 wherein the integral cutting tool is pivotally moveable between: said first deployed position wherein the blade protrudes out of the slider for cutting an opening in a container; said second stowed position, and a third slider only position wherein the integral cutting means is locked in a position wherein the thumb tab is exposed for use and yet the blade is concealed.

3. The opening and reclosing device according to claim 1 wherein the slider comprises at least one nipple for limiting the free pivotal movement of the integral cutting tool, and wherein the integral cutting tool can be moved past the nipple to pivotally move the integral cutting tool into said first deployed position wherein the blade protrudes out of the slider for cutting an opening in a container.

4. The opening and reclosing device according to claim 3 wherein the nipple is hemispherical in shape.

5. The opening and reclosing device according to claim 4, wherein the integral cutting tool comprises a first leg portion between the thumb tab and the coupling means, wherein the nipple comprises a blunt edge and wherein an edge of the first leg portion abuts said blunt edge for further retaining the integral cutting tool in the second stowed position.

6. The opening and reclosing device according to claim 1, wherein the slider comprises an opening and wherein the integral cutting tool is located relative to the opening such that a portion of the integral cutting tool, including said thumb tab is moveable out of the opening.

7. The opening and reclosing device according to claim 1 wherein the coupling means comprises at least one detent extending out of the plane of said integral cutting tool and wherein the slider comprises at least one aperture or recess for receiving said at least one detent, wherein the integral cutting tool comprises a first leg portion between the thumb tab and the coupling means; and wherein the integral cutting tool comprises a second leg portion between the coupling means and the blade tip.

8. The opening and reclosing device according to claim 7 wherein the at least one detent extends outwardly of a plane of a main body portion of the integral cutting tool at a first corner region thereof; and wherein an internal radius of curvature of the first corner region is between 90° and 140°.

9. The opening and reclosing device according to claim 8 wherein said second leg portion extends from the corner region such that the first and second leg portions are angled relative to one another at an angle of 120°.

10. The opening and reclosing device according to claim 8, wherein the second leg portion terminates in a second corner region which has an internal angle of about 90°, wherein a blade section extends from the second corner region and wherein a shaped return section of the slider casing is provided for covering and protecting the blade tip.

11. The opening and reclosing device according to claim 1 wherein the slider comprises two parts, wherein the two parts are connected by a living hinge and wherein the integral cutting tool is held between the two parts by location of at least one detent in an aperture, dimple or recess provide on said integral cutting tool and said two parts, and wherein the slider comprises a rear opening at the end of the living hinge, and wherein the thumb tab extends through said rear opening outwardly of the slider.

12. A method of opening and reclosing a container, the method comprising:
(i) affixing the opening and reclosing device of claim 1 to a container;
(ii) deploying said integral cutting tool to create an opening in the container, the size, configuration and position of which opening is determined by the opening and reclosing device; and
(iii) reclosing the opening formed in the container by utilizing said zip-locking mechanism of the opening and reclosing device.

13. A container having the opening and reclosing device of claim 1 affixed thereto.

* * * * *